No. 681,250. Patented Aug. 27, 1901.
M. NIÉLL.
CHANGING BAG FOR CAMERAS.
(Application filed Dec. 2, 1899.)
(No Model.)
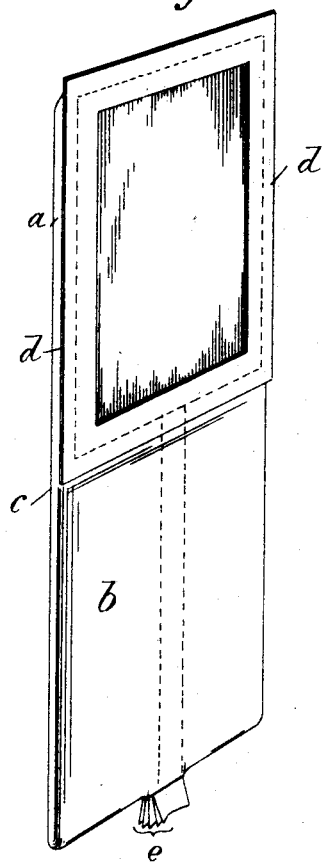
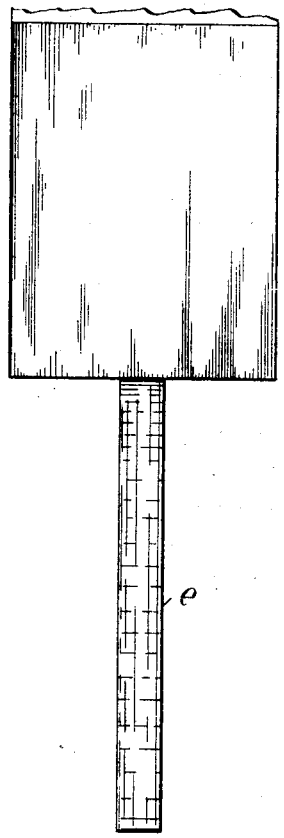
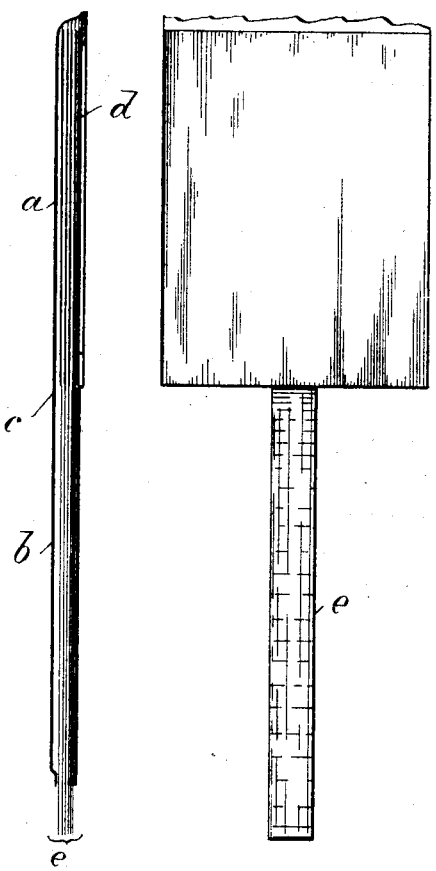
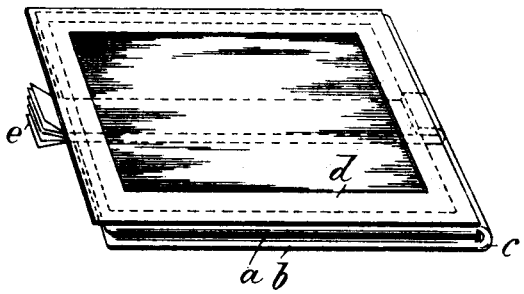
WITNESSES:
Ella L Giles
INVENTOR,
Magnus Niéll
BY
Richardson
ATTORNEYS

UNITED STATES PATENT OFFICE.

MAGNUS NIÉLL, OF LONDON, ENGLAND.

CHANGING-BAG FOR CAMERAS.

SPECIFICATION forming part of Letters Patent No. 681,250, dated August 27, 1901.

Application filed December 2, 1899. Serial No. 739,024. (No model.)

*To all whom it may concern:*

Be it known that I, MAGNUS NIÉLL, engineer, residing at London, S.W., England, have invented certain new and useful Improvements in Changing-Bags for Cameras, of which the following is a full, clear, and exact specification.

This invention relates to improvements in photographic apparatus, and has for its object the production of a simple apparatus for changing sensitized plates or films.

For changing sensitized plates or films placed in succession one against another comparatively complicated and bulky devices have hitherto been required.

This invention consists in a changing-bag which is of a very simple construction, is very easily manipulated, occupies small space, and enables the films to be readily carried after exposure without any further operation.

The essential feature of my invention is that a kind of bag is formed of opaque material, divided into two parts, one of which carries the sensitized films placed one against the other ready for exposure, while the other part holds the films which have been exposed, each film after exposure being drawn from the first part into the second part.

The invention is illustrated on the accompanying drawings.

Figure 1 is a perspective view of the improved changing-bag containing the films opened out. Fig. 2 is a vertical section of the same. Fig. 3 is a face view of a film with attached strip, to be referred to. Fig. 4 is a perspective view of the changing-bag containing the films folded together.

The elongated bag is formed in two parts $a$ and $b$. The part $a$ is fastened in a frame $d$, which serves to guide the bag into the case receiving the films and to render it light-tight. The part $a$ is cut away behind the opening in the frame in order that the outermost of the sensitized films may be exposed when the shutter is removed. The films are separated from each other by an opaque layer.

In order that the exposed films may be changed—that is, transferred from the part $a$ to the part $b$—each film is provided with a strip or band $e$, (see Fig. 3,) which is carried through the bag, so as to project somewhat through a light-tight slot at the bottom of the part $b$, where the projecting ends of the strips of the films thus form a bunch of tags. The exposed film is withdrawn by pulling the tag affixed to it. In order to prevent the adjacent film from being pulled down through frictional contact, each individual film may be lightly secured to the top of the part $a$ by a strip of tissue-paper, so that on drawing out the tag this connection must be severed by the pull before the film can slide down.

The case into which, as already stated, the bag, with frame $d$, is adapted to fit may form a part of the camera itself. To insert the bag in the case, the former is folded along the line $c$ at the middle, so that the two parts $a$ and $b$ lie one against the other. (See Fig. 4.) The films when all exposed can also be preserved perfectly light-tight in the bag folded in this manner.

Having now fully described my invention, what I claim as new, and desire to secure by Letters Patent, is—

1. A changing device for flat films and plates comprising a plain bag of opaque flexible material twice as long as it is wide, said bag having one-half of one side open and a frame secured to the edges of said open side, said bag being ordinarily folded over but being designed to be spread out or unfolded in changing the plates, substantially as described.

2. A changing device for flat films and plates comprising a plain bag of opaque material having both ends closed light-tight, said bag being twice as long as it is wide and having one-half of one side open, a frame secured to the edges of said open half, said bag being also ordinarily folded over and forming two compartments but being designed to be unfolded for changing the plates and films, and tapes attached to the plates and films and passing through a light-tight slot in the end of the bag for drawing the plates from one compartment to the other, substantially as described.

3. A changing device for flat films and plates comprising a plain bag of opaque material having both ends closed light-tight, said bag being twice as long as it is wide and having one-half of one side open, a frame secured to the edges of said open half, said bag being also ordinarily folded over and forming two compartments but being designed to be unfolded for changing the plates and films, a rupturable connection between each film and the bag for holding all but the film to be changed against movement, and tapes attached to the plates and films and passing through a light-tight slot in the end of the bag for drawing the plates from one compartment to the other, substantially as described.

In witness whereof I have hereunto set my hand in presence of two witnesses.

MAGNUS NIÉLL.

Witnesses:
ALBERT E. PARKER,
JOHN B. CLEMENTS.